(12) United States Patent
Hua et al.

(10) Patent No.: US 7,610,554 B2
(45) Date of Patent: Oct. 27, 2009

(54) TEMPLATE-BASED MULTIMEDIA CAPTURING

(75) Inventors: Xian-Sheng Hua, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/263,709

(22) Filed: Nov. 1, 2005

(65) Prior Publication Data

US 2007/0101267 A1 May 3, 2007

(51) Int. Cl.
*G06F 3/00* (2006.01)
*G06K 9/60* (2006.01)

(52) U.S. Cl. .................. 715/731; 715/721; 382/305

(58) Field of Classification Search .......... 715/721, 715/731; 382/305
See application file for complete search history.

(56) References Cited

U.S. PATENT DOCUMENTS

| | | | | |
|---|---|---|---|---|
| 5,613,057 | A * | 3/1997 | Caravel | 715/204 |
| 6,055,246 | A * | 4/2000 | Jones | 370/503 |
| 6,606,117 | B1 * | 8/2003 | Windle | 348/239 |
| 2004/0080611 | A1 * | 4/2004 | Kakii et al. | 348/14.16 |
| 2004/0114746 | A1 * | 6/2004 | Caspi et al. | 379/202.01 |
| 2005/0044503 | A1 * | 2/2005 | Richardson et al. | 715/753 |
| 2006/0026529 | A1 * | 2/2006 | Paulsen et al. | 715/776 |
| 2006/0035710 | A1 * | 2/2006 | Festejo et al. | 463/36 |
| 2007/0283236 | A1 * | 12/2007 | Sugiura et al. | 715/500.1 |

OTHER PUBLICATIONS

Bennett, et al., "Proscenium: A Framework for Spatio-Temporal Video Editing", MM'03, Nov. 2-3, 2003, Berkeley, California, 8 pages.
Foote, Jonathan et al., "Creating Music Videos Using Automatic Media Analysis", 8 pages.
Girgensohn, Andreas et al., "A Semi-automatic Approach to Home Video Editing", UIST '00, San Diego, CA, CHI Letters vol. 2, 2, pp. 81-89.
Girgensohn, Andreas et al, "Home Video Editing Made Easy—Balancing Automation and User Control", 8 pages.
Graham, Jamey et al., "The Video Paper Multimedia Playback System", MM '03, Nov. 2-3, 2003, Berkeley, CA, 2 pages.
Hua, et al., "Automatically Convering Photographic Series into Video", MM '04, Oct. 10-16, 2004, New York, NY, 8 pages.
Hua, et al., "AVE—Automated Home Video Editing", 2003, ACM, 8 pages.
Hua, Xian-Sheng et al., "Video Booklet", 4 pages.
Ma, et al., "A User Attention Model for Video Summarization", ACM Multimedia 2002, Dec. 2003, 10 pages.
Yip, Sam et al., "The Automatic Video Editor", MM '03, Nov. 2-8, 2003, Berkeley, CA, 2 pages.

* cited by examiner

*Primary Examiner*—Joshua D Campbell
*Assistant Examiner*—Stephen Alvesteffer
(74) *Attorney, Agent, or Firm*—Lee & Hayes, PLLC

(57) ABSTRACT

Systems and methods for template-based multimedia capturing are described. In one aspect, a capturing template is selected to facilitate capturing a particular quantity and type(s) of media content. Media content is captured based on a temporal structure provided by the capturing template. These quantities and types of media content captured with respect to the temporal structure facilitate media content browsing, indexing, authoring, and sharing activities.

13 Claims, 6 Drawing Sheets

400

| L | C1 | C2 | | | C3 | C4 | T |
|---|----|----|----|----|----|----|---|
|   |    | C2S1 | C2S2 | C2S3 |   |   |   |

*Fig. 4*

TEMPLATE-BASED MULTIMEDIA CAPTURING

BACKGROUND

The rapid adoption of digital cameras and camcorders has resulted in explosive growth of personal photos and home video in digital form. There is a huge demand for new tools and systems to enable an average user to efficiently and effectively capture, process, manage, author and share digital media contents. Although video authoring tools exist, video authoring remains as a tedious and extremely time consuming task that often requires trained professional skills. Conventional content analysis techniques have tried to address these issues; however, these are difficult problems to resolve due to the difficulties in bridging the gap between high-level semantics with low-level features.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, template-based multimedia capturing is described. In one aspect, a capturing template is selected to facilitate capturing a particular quantity and type(s) of media content. Media content is captured based on a temporal structure provided by the capturing template. These quantities and types of media content captured with respect to the temporal structure facilitate media content browsing, indexing, authoring, and sharing activities.

BRIEF DESCRIPTION OF THE DRAWINGS

In the Figures, the left-most digit of a component reference number identifies the particular Figure in which the component first appears.

FIG. 4 shows an exemplary set of temporal capturing template lattices for semi-transparent presentation to a user of a media content capturing device, according to one embodiment.

DETAILED DESCRIPTION

Overview

Existing content analysis-based systems depend on effectiveness and efficiency of media content analysis algorithms. However, such conventional media content analysis algorithms are substantially limited due to the difficulties in bridging the gap between high-level semantics with low-lever features. One way to address these difficulties is to collect more information during the process of media capturing. Such information, for example, may include GPS data, speech, text input by users, and so on. However, few (if any) schemes are available to a user to gather such additional information in the context of media capturing. To address this void, the systems (e.g., systems, apparatus, computer-readable media, means, etc.) and methods for template-based multimedia capturing, as described below in reference to FIGS. 1 through 8, provide an efficient and unified extra-information capturing framework and scheme.

The systems and methods for template-based multimedia capturing provide a uniform framework and scheme to collect extra information during the process of media capturing in an easy and convenient manner. To this end, predefined capturing templates are used by a media content capturing device (e.g., a video camcorder, etc.) to instantly guide a user to capture sufficient amounts and types of raw media content/data. The extra information represented by the captured media content substantially improves performance of media indexing, browsing, authoring, and sharing.

These and other aspects of the systems and methods for template-based multimedia capturing are now described in greater detail.

An Exemplary System

Although not required, the systems and methods for template-based multimedia capturing are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
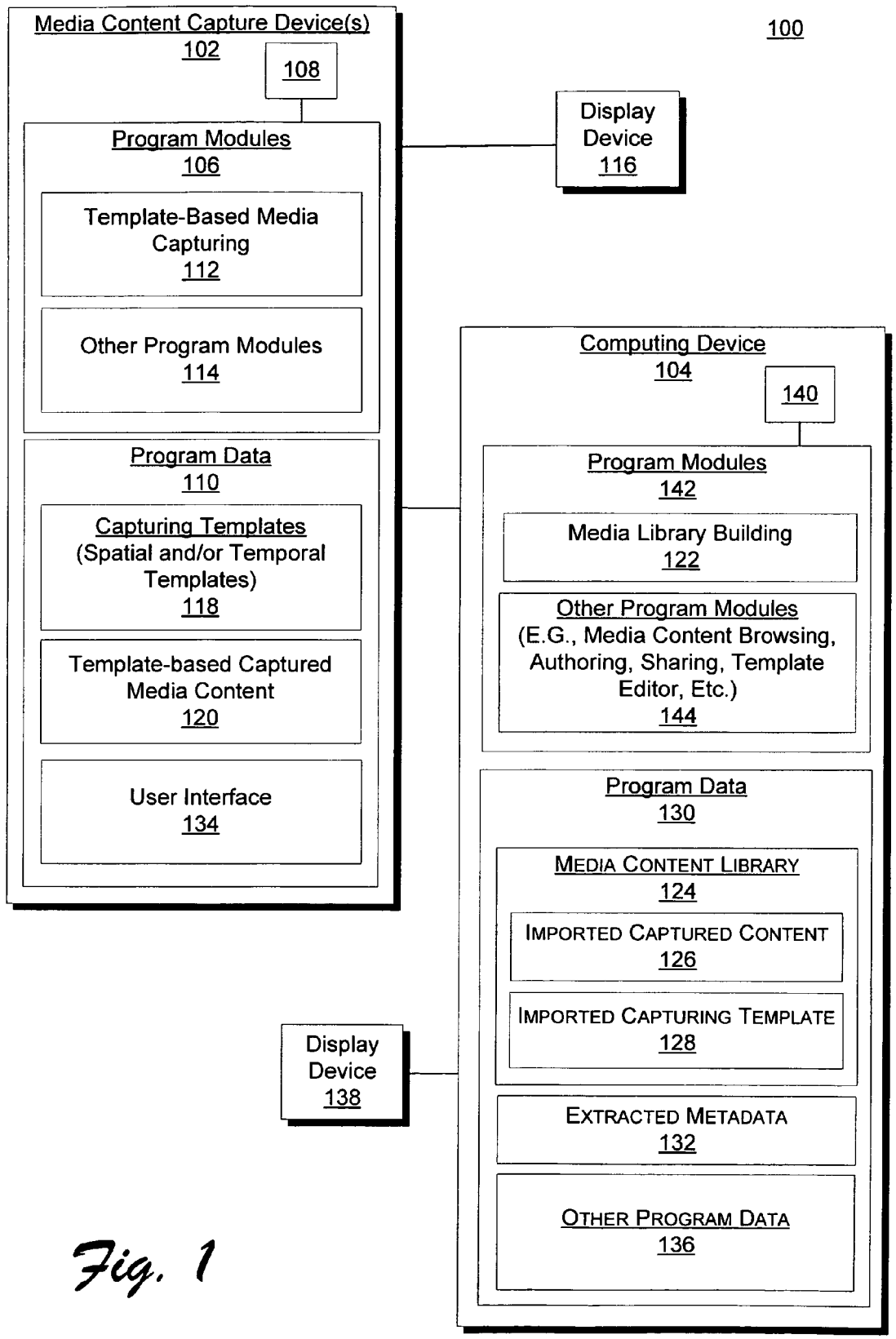
FIG. 1 illustrates an exemplary system for template-based multimedia capturing, according to one embodiment.

FIG. 1 illustrates an exemplary system 100 for template-based multimedia capturing, according to one embodiment. System 100 includes a capturing device 102 (e.g., a video camcorder, Pocket PC, smart phone, etc.) that can be directly or wirelessly coupled to a computing device 104. Capturing device 102 includes computer-program modules 106 with instructions executable by a processor 108 and program data 110. Program modules 106 include, for example, template-based media capturing module 112 and other program modules 114 such as an operating system. A user interfaces with template-based media capturing computer-program module 112 (e.g., via a monitor such as display device 116) to download or otherwise access one or more capturing templates 118. Capturing template(s) 118 can be downloaded and/or accessed from local or remote data sources. Media capturing module 112 utilizes capturing templates 118 to assist the user in capturing sufficient amounts and types of media content within a specific context for subsequent media content indexing, browsing, authoring, and/or sharing operations.

A capturing template 118 includes a structural framework for simple photograph with text descriptions that demonstrate and specify how to frame (or pose) one or more scenes, peoples, and objects during media content capturing operations. Capturing templates 118 include one or more of spatial templates and temporal templates. Although a spatial template 118 includes a temporal framework, capture device 102 utilizes a spatial template 118 to capture still images. Capture device 102 utilizes a temporal template 118 to capture video content. Exemplary aspects of a spatial template 118 are described in greater detail below in the section type titled "Exemplary Spatial Template". Exemplary aspects of a temporal template 118 are described in greater detail below in the section titled "Exemplary Spatial Templates".

Before a user begins capturing media content, if the user has not already selected a particular capturing template 118 (e.g., a default template, and/or so on), template-based media capturing module ("media capturing module") 112 allows the user to select a particular capturing template 118. Media capturing module 112 displays the framework of the selected capturing template 118 on the display device 116 (e.g., a monitor, LCD, etc.). Such display is performed semi-transparently on the monitor so that the user can match a real scene with the sketch to obtain a better-quality photo or video. Utilizing media capturing module 112, the user begins capturing data using the selected capturing template 118 to guide the media capturing operations, and thereby ensure that the user captures sufficient amounts and types of media content. For purposes of exemplary illustration, such captured data is shown as template-based captured media content ("captured media content") 120.

Referring to computing device 104, and utilizing Media Library Building (MLB) module 122, a user imports captured media content 120 along with the selected capturing template 118 (used to capture captured media content 120) to a media content library 124. Imported captured content 126 and imported capturing template 128 respectively represent captured media content 120 and the selected capturing template 118. For purposes of exemplary illustration, media content library 124 is shown as local to computing device 104 (i.e., a respective portion of program data 130). However, media content library 124 can be local or remote to computing device 104. If media content library 124 is remote to the computing device 104, a user interfaces with Media Library Building (MLB) module 122 to access the remote media content library 124 to obtain imported captured content 126 and imported capturing template 128.

MLB 122 analyzes imported captured content 126 in view of information embedded in the imported capturing template 128 to extract metadata (i.e., extracted metadata 132) for subsequent media content indexing, browsing, searching, authoring, and/or sharing operations (e.g., please see "other program modules" 132). For example, a temporal structure embedded in the imported capturing template 128 is applied during scene grouping operations. In one implementation, the temporal structure includes a layer called "scene". If content associated with a scene slot is not the same as other content in the scene, the "scene" defined in the template 126 is given highest priority. This is because the scene definition in the template is provided by a user. In one implementation, information embedded in the imported capturing template 128 may also be used to group the shots in a scene slot in the template into shot group(s), which can also be called "scene(s)".

The media content analysis operations of module 122 are configurable and extensible (e.g., via plug-ins) and include, for example, online and off-line media content filtering operations. Examples of content filtering include shot detection, sub-shot detection, scene grouping, motion detection, key-frame extraction, histogram extraction, quality assessment, etc. The types of metadata 222 that are extracted are a function of the particular content filtering applied by MLB 122.

In one implementation, capture device 102 has sufficient processing power and data storage capabilities to implement computer-program logic for one or more of MLB 122 and logic for indexing, browsing, authoring, and sharing captured media content (e.g., please see "other program modules" 136).

Exemplary Spatial Templates

Figures 2, 3:
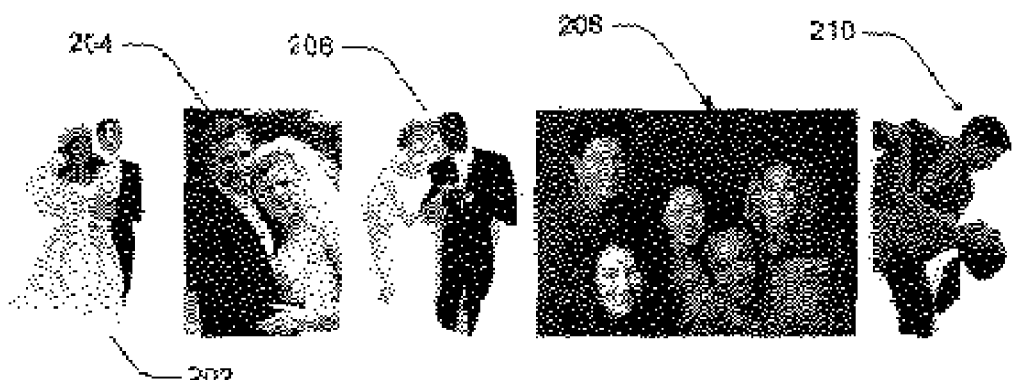
FIG. 2 shows an exemplary set of spatial templates, according to one embodiment.
FIG. 3 shows an exemplary structure of a sample temporal capturing template for a birthday party, according to one embodiment.

FIG. 2 shows an exemplary set of spatial templates, according to one embodiment. As discussed below, template-based media capturing module 112 displays respective ones of the sketches semi-transparently onto a monitor to allow a user to match a real scene with a respective sketch and thereby, obtain a better quality photo or video (e.g., helping a user find a good picture spot and photograph from a good angle of view). In the example of FIG. 2 the sketches are for photographing wedding pictures. These types of photographs typically have general poses and positions/layout.

Exemplary details of a spatial capturing template 118 are shown below in reference to TABLE 1.

TABLE 1

EXEMPLARY XML DESCRIPTION OF MULTIPLE-ELEMENT SPATIAL CAPTURING TEMPLATE

```
<?xml version="1.0" ?>
<LazyCap type="Photo">
<Info>
    <Title> Wedding - Romantic Style 1 </Title>   <Author>John
    </Author>
    <Email> john@abc.com </Email>   <URL>
    http://www.abc.com/john</URL>
    <Description> This LazyCap capturing template is for ...
    </Description>
</Info>
<Photo>
    <Title>Wedding - On the Beach</Title>
    <Sketch> <![CDATA[ ...... ]]> </Sketch>
    <Description> The bride stands closely with the groom, and the
    groom ... </Description>
</Photo>
<Photo>
    <Title>Wedding - Kiss Close-Up</Title>
    <Sketch> <![CDATA[ ...... ]]> </Sketch>
    <Text></Text>
    <Speech><![CDATA[ ...... ]]></Speech>
    <Description> The bride groom ... </Description>
</Photo>
</LazyCap>
```

Referring to TABLE 1, and in this implementation, the binary representations (e.g., please see FIG. 2) of a spatial template 118 are embedded in an Extensible Markup Language (XML) data format as a binary data element. In this example, <![CDATA[ . . . ]]> is the binary data element. The binary data is represented by " . . . ". The actual binary data is the picture or animation.

Exemplary Temporal Templates

A temporal capturing template (TCT) 118 defines a temporal structure of the to-be-captured media data (template-based captured media content 120). In this implementation, a temporal capturing template 118 is represented in the XML data format. The basic temporal unit of TCT is "MSeg" (also called "Slot" when it is rendered), which stands for "Media Segment". MSeg could be a chapter, a scene or a shot, or whatever temporal segment of a media data. For a specific template, MSegs may be arranged hierarchically or "flatly". In this implementation, all MSegs share the same definition and structure. The default settings for a child MSeg are the settings of its parent MSeg, while child MSeg can has its own settings which have higher priority. A typical hierarchical structure could be "Chapter—Scene", which is similar to a general DVD content menu In this implementation, a TCT 118 contains at least one chapter (MSeg). A Chapter may contain several Scenes (also MSegs), while a Scene can contain one or more smaller scenes, and so on. In this implementation, there are three types of MSegs, including Video, Photo and "Phodeo" (representing a combination of photos and videos). Video MSegs will guide users to capture one or more video clips, Photo MSegs will guide users to photograph one or a series of pictures using Spatial LazyCap Template, while Phodeo MSegs mean it contain both Video and Photo sub-MSegs.

A good example of a TCT 118 is a comprehensive shot list for a typical birthday party proposed, which includes, for example: establishing, pre-party, guests arriving, meeting and greeting, environment, lighting candles, singing happy birthday, eating cake, giving and opening gifts, and/or so on shots.

FIG. 3 shows an exemplary structure 300 of a sample Temporal Capturing Template for a birthday party, according to one embodiment. As shown, this template includes six chapters, including one leader chapter (Location and Preparation), four body chapters (Guests arriving and greeting, The party, Guests leaving and giving favors, and Final words of the birthday child), and one tail chapter. And the second body chapter contains three scenes.

TABLE 2 shows an exemplary XML description of MSeg "Chapter 2" of FIG. 3, which contains three child MSegs.

TABLE 2

EXEMPLARY XML DESCRIPTION OF AN "MSEG" WITH 3-SUB-MSEGS

```
<MSeg level="1" mtype="Video">
    <Title>The Party</Title>
    <MSeg level="2" mtype="Video">
        <Title>Candles and Song</Title>
        <Duration fixed="false">480</Duration>
        <Sketch> <![CDATA[ ...... ]]> </Sketch>
        <Description> This slot captures ... </Description>
        <Text></Text>    <Speech><![CDATA[ ...... ]]></Speech>
    </MSeg>
    <MSeg level="2" mtype="Video">
        <Title>Eating Cake</Title>
        <Duration fixed="true">300</Duration>
        <Sketch> <![CDATA[ ...... ]]> </Sketch>
        <Description> In this slot, you ... </Description>
        <Text></Text> <Speech><![CDATA[ ...... ]]></Speech>
    </MSeg>
    <MSeg level="2" mtype="Video">
        <Title>Giving and Opening Gifts</Title>
        <Duration fixed="true">420</Duration>
        <Sketch> <![CDATA[ ...... ]]> </Sketch>
        <Description> In this slot, capture ... </Description>
        <Text></Text>    <Speech><![CDATA[ ...... ]]></Speech>
    </MSeg>
</MSeg>
```

XML syntax of TCT templates 118 is now described. In this implementation, a TCT file 118 contains one root element which includes a sub-element called "TCTInfo", as well as a series of "flat" or hierarchical MSegs. TCTInfo provides the basic information of the TCT, including five basic sub-elements, as listed in TABLE 3.

TABLE 3

EXEMPLARY TEMPORAL CAPTURING TEMPLATE INFORMATION (TCTInfo)

| Name | Description |
| --- | --- |
| Title | The title/name of the TCT template. |
| Author | The author of this template. |
| Email | The email of the template author. |
| URL | The URL of the relevant website. |
| Description | Description of the template. |
| Icon | Icon of the TCT (binary data element). |

In this example, MSeg has two primary attributes and four sub-elements, as listed in TABLES 4 and 5, respectively.

TABLE 4

EXEMPLARY ATTRIBUTES OF THE ELEMENTS "MSEG"

| Name | Description |
| --- | --- |
| level | The structure level. The first level is "1". MSeg may contain multiple child MSegs, the level of a child MSeg is the level of its parent MSeg plus 1. |
| mtype | Specify media type of the source data. May be "Video", "Photo" or "Phodeo" (stands for Photo and Video). |

TABLE 5

EXEMPLARY ATTRIBUTES OF THE SUB-ELEMENTS OF "MSEG"

| Name | Description |
| --- | --- |
| Title | The title of the MSeg, e.g., the caption of a chapter or a scene. |
| Duration | The suggested duration of the raw content to-be-captured in the MSeg. It has only one attribute called "fixed", which specifies whether the duration is fixed, or can be altered. |
| Sketch | A static picture (graphical or photographic) or animation to show how to capture video/photo for this slot. |
| Description | Text description for how/what to capture for this slot. |
| Text | User's text description for the captured data in this slot. |
| Speech | User's speech description for the captured data. |

Template UI Rendering

Template-based media capturing module 112 parses a user selected TCT (XML file) 118, and then constructs an interface to get users' inputs (to be exact, to capture photos or video clips). For purposes of exemplary illustration, such a user face is shown user interface 134 of FIG. 1. A Spatial Capturing Template (SCT) 118 is regarded as an MSeg of a TCT 118. In view of this, the following description, which describes rendering a TCT 118 also applies to rendering a subset of the features of a TCT (i.e., a SCT). It should be mentioned that, the UI engine is device dependent, and can also be personalized to present different experiences for capturing media content. Template-based media capturing module 112 of FIG. 1 parses the hierarchical structure of the TCT 118, and draws a series of corresponding "lattices" representing the MSegs in the TCT as a timeline, as described in reference to FIG. 4.

Figure 4:
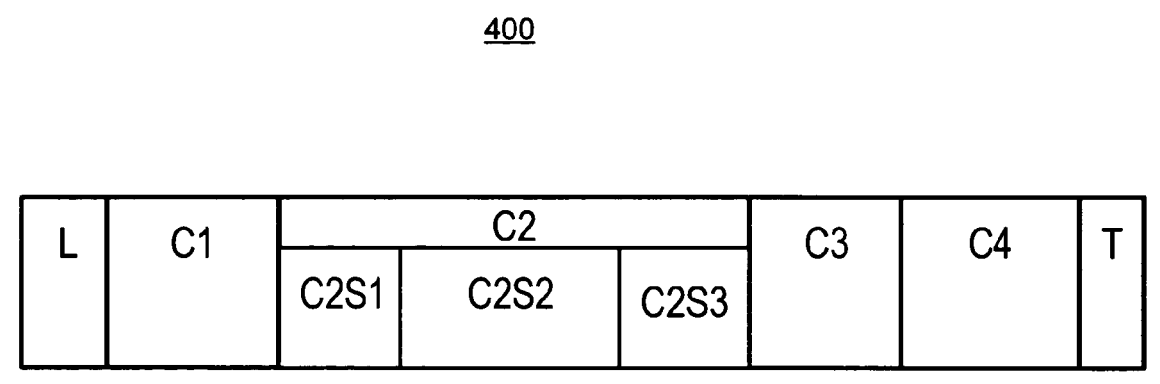

FIG. 4 shows an exemplary set of TCT lattices for semi-transparent presentation to a user of a media content capturing device, according to one embodiment. Slot titles are displayed in the corresponding lattices, and details (title, duration, description, etc.) of a certain slot (i.e., MSeg, such as L, C1, C2, C2S1, etc.) will be displayed in a window when the corresponding slot is clicked or obtains focus.

Figure 5:
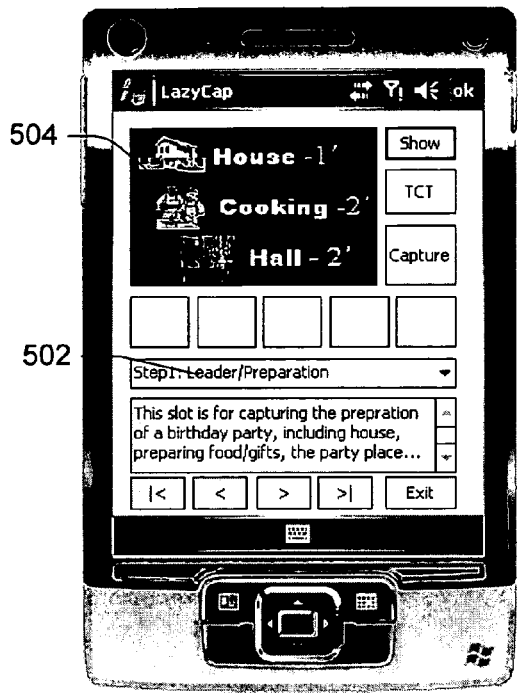
FIGS. 5 and 6 show exemplary aspects of a template-based media capturing user interface presented on a capturing device, according to respective embodiment.
Figure 6:
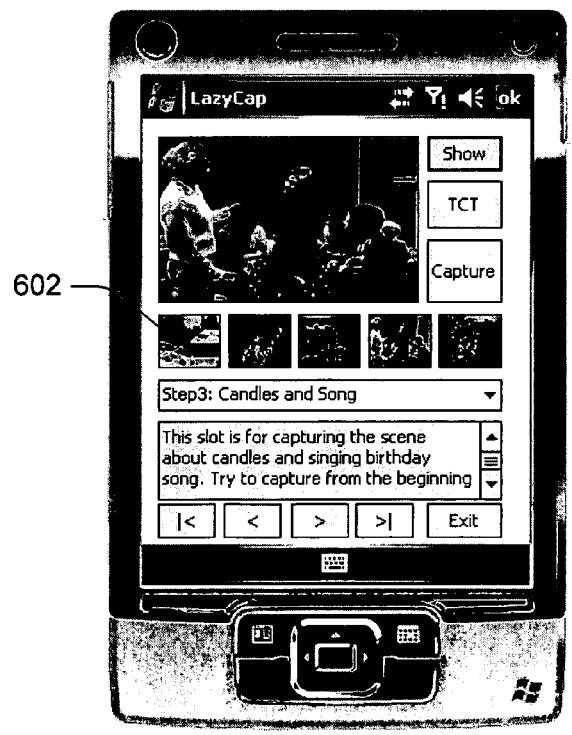

FIGS. 5 and 6 show an exemplary template-based media capturing user interface presented on a capturing device, according to one embodiment. FIG. 5 shows that a user has selected a first slot in a drop-down slot list 502 in the capturing template 118. FIG. 6 shows that the temporal capturing template includes captured content. A static or animated sketch 602 is presented to the user if the user presses a button titled "Show". In this implementation, a user can to adjust some MSeg parameters (e.g., the duration and caption) in a detail window 504. Slot adding, deleting, copying, pasting and moving are also supported. Template-based media capturing module 112 (FIG. 1) allows the user to save a modified capturing template 118 as a new template. Template editing operation availability may be dependent on the capability of the capturing devices 102, such as the size of the monitor 116 and the power of the capturing devices processor 108. During the process of capturing, users are able to find a specific lattice and then begin to do capturing.

After capturing raw media content with a certain TCT 118, the result file, named Captured Content File (CCF) (i.e., template-based captured media content 120), is in the same form as TCT 118, except that the "Text" and "Speech" elements may filled with data, an element called "Content" is inserted into element "MSeg" (specify the links to the raw media data). CCF files provide all the information for further applications, such as browsing, authoring and sharing. For example, "text" and "speech" can be used for search operations. Template structure can be applied in authoring and browsing, etc.

An Exemplary Procedure

Figure 7:
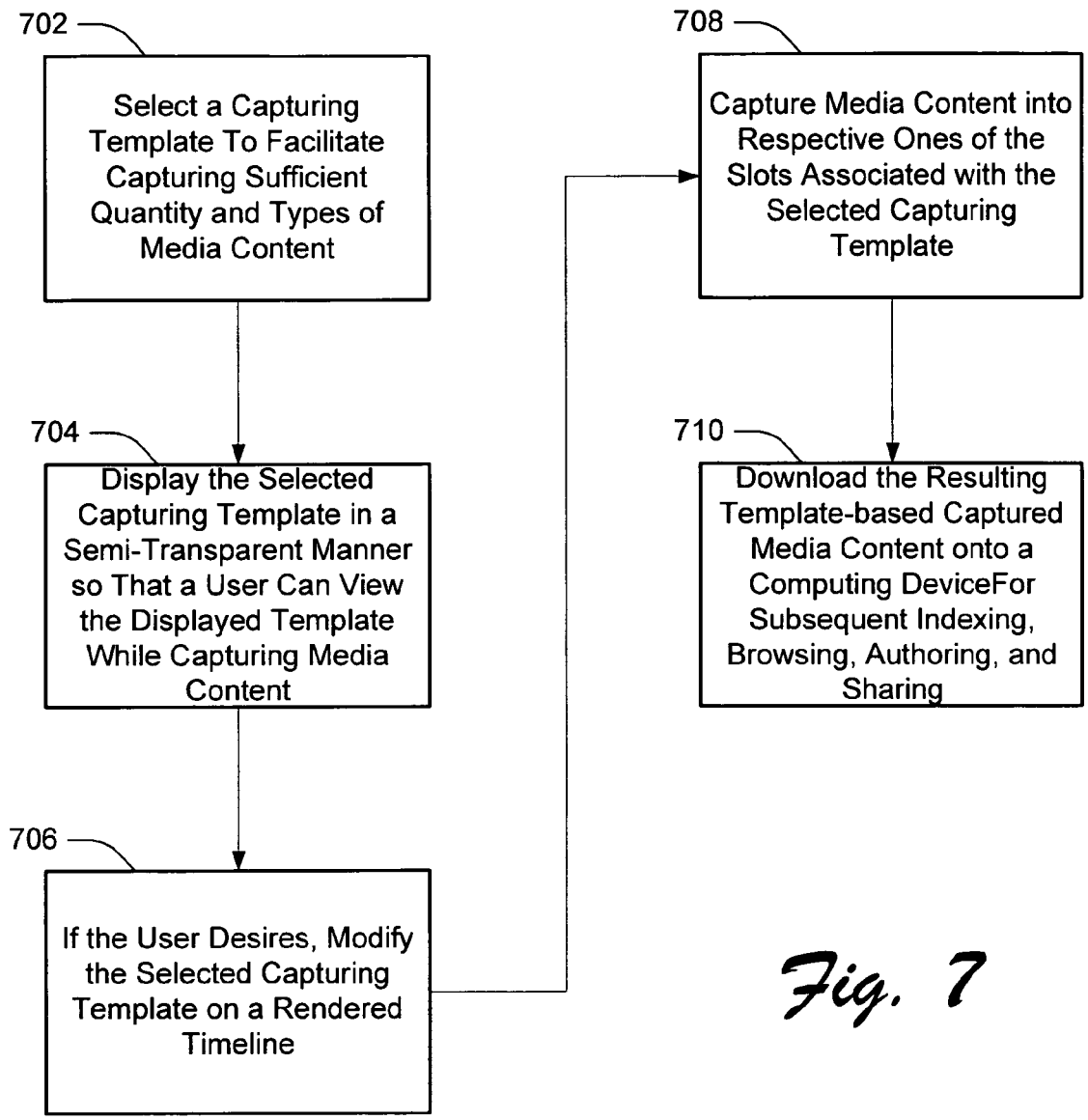
FIG. 7 shows an exemplary procedure for template-based multimedia capturing, according to one embodiment.

FIG. 7 shows an exemplary procedure 700 for template-based multimedia capturing, according to one embodiment. For purposes of exemplary description and illustration, the operations of procedure 700 are described in reference to the components of system 100 of FIG. 1. In this description, the leftmost numeral of a component reference number identifies the figure in which the component is first described.

At block 702, a user selects a capturing template 118 (FIG. 1) to facilitate capturing sufficient quantity and types of media content. At block 704, template-based media capturing module 112 displays the selected capturing template 118 in a semi-transparent manner on a display device 116. Displaying the selected capturing template 118 in such a way allows the user to view the displayed template while capturing media content with a capture device 102. At block 706, if the user desires, the user can edit or modify the selected capturing template on a rendered timeline. Such editing may include, for example, moving slots in the template, changing parameters, slot durations, etc. At block 708, media content capture device 104 captures media content based on respective ones of the slots associated with the selected capturing template 118. Such captured media content is shown in FIG. 1 as template-based captured media content 120. At block 710, if the media content capture device 104 does not have the processing and/or memory capability to perform indexing, browsing, authoring, and/or sharing operations with respect to template-based captured media content 120, content 120 is transferred (e.g., downloaded, uploaded, accessed, etc.) to a computing device (e.g., computing device 104) with such processing and memory resources and associated program logic.

An Exemplary Operating Environment

Figure 8:
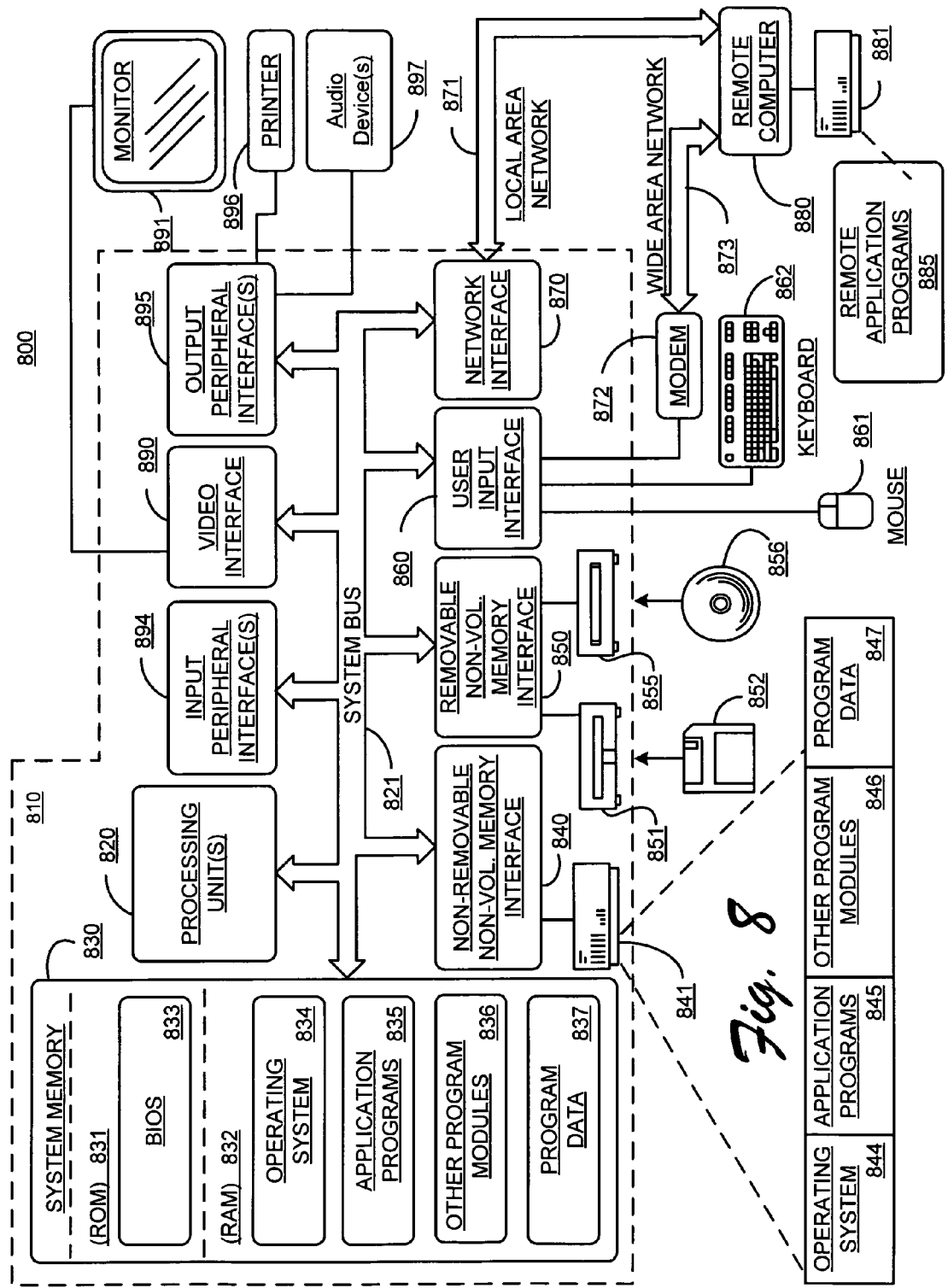
FIG. 8 illustrates an example of a suitable computing environment in which template-based multimedia capturing may be fully or partially implemented.

FIG. 8 illustrates an example of a suitable computing environment in which template-based multimedia capturing may be fully or partially implemented. Exemplary computing environment 800 is only one example of a suitable computing environment for the exemplary system 100 (as described above with respect to FIGS. 1 through 7) and is not intended to suggest any limitation as to the scope of use or functionality of systems and methods the described herein. Neither should computing environment 800 be interpreted as having any dependency or requirement relating to any one or combination of components illustrated in computing environment 800.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may be practiced in a distributed computing environment where tasks are performed by remote processing devices that are linked through a communications network. In a distributed computing environment, program modules may be located in both local and remote memory storage devices.

With reference to FIG. 8, an exemplary system for template-based multimedia capturing includes a general purpose computing device in the form of a computer 810 implementing, for example, system 200 of FIG. 2. The following described aspects of computer 810 are exemplary implementations of computing devices 202 of FIG. 2. Components of computer 810 may include, but are not limited to, processing unit(s) 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 810 typically includes a variety of computer-readable media. Computer-readable media can be any available media that can be accessed by computer 810 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Application programs 835 includes, for example program modules 106 or 142 of FIG. 1. Program data 837 includes, for example, program data 110 or 130 of FIG. 1. Operating system 844, application programs 845, other program modules 846, and program data 847 are given different numbers here to illustrate that they are at least different copies.

A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to the monitor, computers may also include other peripheral output devices such as printer 896 and audio device(s) 897, which may be connected through an output peripheral interface 895.

The computer 810 operates in a networked environment using logical connections to one or more remote computers, such as a remote computer 880. In one implementation, remote computer 880 represents computing device 202 or networked computer 204 of FIG. 2. The remote computer 880 may be a personal computer, a server, a router, a network PC, a peer device or other common network node, and as a function of its particular implementation, may include many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example and not limitation, FIG. 8 illustrates remote application programs 885 as residing on memory device 881. The network connections shown are exemplary and other means of establishing a communications link between the computers may be used.

Alternate Implementations

Template-based captured media content 120 of FIG. 1 has been described as being captured by a same device (e.g., media content capture device 104) that displays capturing templates 118. However, in one implementation, capturing templates 118 are displayed to a user by a first computing device independent of whether the first device is capable of capturing media content. The user utilizes the capturing templates 118 displayed by the first device to capture sufficient quantity and types of media content (i.e., as directed by the displayed capturing template 118) on a second computing device that is a media content capture device. In this implementation, template-based captured media content 120 is generated independent of whether the second device has implemented template-based media capturing module 112.

In another alternate implementation, template-based media capturing module 112 provides data syncing capabilities. As discussed below these data syncing capabilities allow a user to capture media content with a very high quality media content capturing device without template-based multimedia capturing capabilities to obtain the same benefits provided by template-based media capturing module 112. More particularly, while generating template-based captured media content 120, template-based media capturing module 112 provides timestamp information to the information in a selected capturing template 118. At the same time that template-based captured media content 120 is being generated, a second user utilizes a second media content capture device to capture another set of media content. It is not necessary for template-based media capturing module 112 functionality to be implemented on the second computing device. For purposes of exemplary illustration, the second computing device is represented by computing device 104 of FIG. 1, and such captured media content is represented as a respective portion of "other program data" 136.

Since both media content authors are using media capturing systems at the same time (coincident) the temporal sequence of the captured media content will be substantially similar. In this scenario, the media content captured by the second device is imported to the first device. At this point, template-based media capturing module 112 synchronizes the timestamps across the respective media content captured by the first and second devices. The synchronization allows template-based media capturing module 112 to modify media content captured by the second device into corresponding slots in the capturing template 118 utilized by the first device. Additionally, any metadata extracted (e.g., extracted media 132) with respect to media content captured by the first device will also be applicable to the media content captured by the second device.

In yet another alternate implementation, a displayed capturing template 118 is designed as both a tour guide and a framework to guide user capture of media content while touring a geographical location. In this implementation, tour information is embedded in the description element, or additional tags are utilized to embed further information, such as photographs, links, music, audio introductions, etc. For example, a capturing template 118 may include tour information of a city's main attractions, including transportation, shopping, schedules, ticket information, highlight photo spots, etc.

CONCLUSION

Although the systems and methods for template-based multimedia capturing have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
   selecting a capturing template at a first media content capturing device to facilitate capturing a particular quantity and type(s) of media content, wherein the capturing template is a spatial capturing template, a temporal capturing template, or a combination of the spatial and temporal capturing template, the spatial capturing template being used to capture still image media content, the temporal capturing template being used to capture video media content, the combination being used to capture a combination of a still image and a video sequence;
   displaying the capturing template onto a display device of the first media content capturing device, the capturing template being displayed in a semi-transparent manner such that a user can match a real scene with the capturing template while capturing media content, and the capturing template displayed as a plurality of windows, wherein each of a number of the plurality of windows are related to a corresponding media segment of the capturing template and at least one of the number of windows includes media content captured by the first media content capturing device, and wherein an additional window corresponds to a selected media segment of the capturing template and the additional window shows a particular real scene of first visual media content;
   capturing the first visual media content via the first media content capturing device based on a temporal structure provided by the capturing template, wherein the first visual media content is associated with a first set of timestamps;
   importing second visual media content at the first media content capturing device from a second media content capturing device, wherein the second visual media content is associated with a second set of timestamps and the second visual media content is captured coincident with the first visual media content;
   synchronizing the first visual media content and the second visual media content utilizing the first set of timestamps and the second set of timestamps; and
   placing the second visual media content into one or more slots of the capturing template after synchronizing the first visual media content and the second visual media content.

2. The method of claim 1, wherein the capturing template provides a particular context within which a user is to capture the first visual media content, the context being selected from one or more of an event, a scene, a guided tour of a geographical location, and a posing framework.

3. The method of claim 1, wherein the capturing template is represented in an Extensible Markup Language data format.

4. The method of claim 1, wherein the temporal structure comprises at least one chapter, scene, or shot.

5. The method of claim 1, further comprising editing one or more of temporal aspects and parameters associated with the capturing template to generate a new capturing template to direct a user to capture a particular quantity and types of media content.

6. The method of claim 1, further comprising post-processing the particular quantity and type(s) of media content to facilitate one or more of media content indexing, browsing, authoring, and sharing operations.

7. A computer-readable storage medium comprising computer-program instructions executable by a processor to perform acts comprising:
   selecting a capturing template to facilitate capturing a particular quantity and type(s) of media content;
   displaying the capturing template onto a display device, the capturing template being displayed in a semi-transparent manner such that a user can match a real scene with the capturing template while capturing media content;
   capturing first visual media content based on a temporal structure provided by the capturing template and displayed on the display device, wherein the first visual media content is associated with a first set of timestamps;
   importing second visual media content after capturing the first visual media content, wherein the second visual media content is associated with a second set of timestamps and the second visual media content is captured coincident with the first visual media content; and
   synchronizing the first visual media content and the second visual media content utilizing the first set of timestamps and the second set of timestamps such that metadata associated with the first visual media content is associated with the second visual media content, wherein the metadata associated with the first visual media content is utilized to search the first visual media content, browse the first visual media content, index the first visual media content, or a combination thereof.

8. The computer-readable storage medium of claim 7, wherein the capturing template is displayed on a first device and wherein the media content can be captured on a second device.

9. The computer-readable storage medium of claim 7, wherein the capturing template is a spatial capturing template, a temporal capturing template, or a combination of the spatial and temporal capturing template, the spatial capturing template being used to capture still image media content, the temporal capturing template being used to capture video media content, the combination being used to capture a combination of a still image and a video sequence.

10. The computer-readable storage medium of claim 7, wherein the capturing template provides a particular context within which a user is to capture the media content, the context being selected from one or more of an event, a scene, a guided tour of a geographical location, and a posing framework.

11. The computer-readable storage medium of claim 7, wherein the computer-program instructions further comprise instructions for editing one or more of temporal aspects and parameters associated with the capturing template to generate a new capturing template to direct a user to capture a particular quantity and types of media content.

12. A computing device comprising:
a processor;
a memory coupled to the processor, the memory comprising computer-program instructions executable by the processor to:
select a capturing template to facilitate capturing a particular quantity and type(s) of media content, the capturing template comprising at least one chapter, the at least one chapter, scene, or shot;
display the capturing template onto a display device, the capturing template being displayed in a semi-transparent manner such that a user can match a real scene with the capturing template while capturing media content;
capture first visual media content based on a temporal structure provided by the capturing template and displayed on the display device, wherein the first visual media content is associated with a first set of timestamps;
store the first visual media content in a file in response to capturing the first visual media content, the file having a structure including file elements corresponding to elements of the capturing template, wherein a first file element includes a text description of the first visual media content, a second file element includes a speech description of the first visual media content, and an additional file element is added to the structure specifying links to the first visual media content;
import second visual media content from a second computing device, wherein the second visual media content is associated with a second set of timestamps and the second visual media content is captured coincident with the first visual media content; and
synchronize the first visual media content and the second visual media content utilizing the first set of timestamps and the second set of timestamps.

13. The computing device of claim 12, wherein the capturing template is a spatial capturing template, a temporal capturing template, or a combination of the spatial and temporal capturing template, the spatial capturing template being used to capture still image media content, the temporal capturing template being used to capture video media content, the combination being used to capture a combination of a still image and a video sequence.

* * * * *